(12) United States Patent
Johnson et al.

(10) Patent No.: US 7,769,345 B2
(45) Date of Patent: Aug. 3, 2010

(54) DEVICE AND METHOD FOR GUIDING A USER TO A COMMUNICATION POSITION

(75) Inventors: Phillip Marc Johnson, Raleigh, NC (US); L. Scott Bloebaum, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 880 days.

(21) Appl. No.: 11/536,718

(22) Filed: Sep. 29, 2006

(65) Prior Publication Data

US 2008/0093447 A1    Apr. 24, 2008

(51) Int. Cl.
*H04B 5/00* (2006.01)
(52) U.S. Cl. .................. 455/41.1; 455/41.2; 455/456.1; 455/456.6; 235/462.2; 340/854.8; 348/207.99; 348/239; 348/375
(58) Field of Classification Search ................ 455/41.1, 455/41.2, 456.1, 456.6, 457, 517; 348/207.99, 348/239, 375; 340/854.8; 235/462.2
See application file for complete search history.

(56) References Cited

U.S. PATENT DOCUMENTS

| | | | | |
|---|---|---|---|---|
| 4,298,875 | A * | 11/1981 | Sullivan | 342/455 |
| 6,731,240 | B2 * | 5/2004 | Dybdal et al. | 342/359 |
| 7,130,583 | B2 * | 10/2006 | Skorpik | 455/41.2 |
| 7,416,127 | B2 * | 8/2008 | Page | 235/462.45 |
| 2005/0087599 | A1 * | 4/2005 | Ward et al. | 235/451 |
| 2005/0269411 | A1 * | 12/2005 | Vesikivi et al. | 235/462.01 |
| 2006/0052055 | A1 | 3/2006 | Rowse et al. | |
| 2006/0148404 | A1 | 7/2006 | Wakim | |
| 2006/0183462 | A1 | 8/2006 | Kolehmainen | |
| 2006/0199533 | A1 * | 9/2006 | Zilliacus et al. | 455/41.2 |

FOREIGN PATENT DOCUMENTS

| | | |
|---|---|---|
| WO | 2004/003801 | 1/2004 |
| WO | 2005/091212 | 9/2005 |
| WO | 2006/119563 | 11/2006 |

OTHER PUBLICATIONS

International Preliminary Report on Patentability for corresponding Application No. PCT/US2007/064756 mailed Apr. 9, 2009.
International Search Report and Written Opinion for corresponding Application No. PCT/US2007/064756 mailed Jul. 27, 2007.

* cited by examiner

*Primary Examiner*—Tuan H Nguyen
(74) *Attorney, Agent, or Firm*—Renner, Otto, Boisselle & Sklar, LLP

(57) ABSTRACT

A portable electronic device that includes an antenna and at least one of a transmitter or a receiver connected to the antenna for transferring information between the portable electronic device and a corresponding device via the antenna. The corresponding device includes a visual indicator indicative of a location of an antenna of the corresponding device. The portable electronic device further includes an imaging device for obtaining an image of the visual indicator, an image analyzer for determining a location of the portable electronic device antenna relative to that of the corresponding device based on the image, a direction analyzer for determining a movement direction of the portable electronic device that would reduce an alignment offset between the antennas, and a directional indicator for indicating the movement direction to a user of the portable electronic device.

25 Claims, 9 Drawing Sheets

DEVICE AND METHOD FOR GUIDING A USER TO A COMMUNICATION POSITION

TECHNICAL FIELD OF THE INVENTION

The present invention relates generally to portable electronic devices and systems, and more particularly to a device and method for guiding a user to a communication position.

DESCRIPTION OF THE RELATED ART

Near Field Communication (NFC) is a short-range wireless connectivity technology designed for intuitive, simple and safe communication between electronic devices. NFC communication is enabled by bringing two NFC compatible devices within a few centimeters of one another or for the two devices to literally "touch" one another. Applications of NFC technology include contactless transactions such as payment and transit ticketing, simple and fast data transfers including calendar synchronization or electronic business cards and access to online digital content.

NFC makes life easier for users—it's easier to get information, easier to pay for goods and services, easier to use public transport, and easier to share data between devices. As a result of NFC, users are able to "pick up" information from their environment. NFC technology allows portable devices to "read" information stored in "tags" on everyday objects. These tags can be affixed to physical objects such as posters, bus stop signs, street signs, medicines, certificates, food packaging and much more. A user will know where to find the tag by looking for the NFC Forum "Target Mark" or a similar icon on the NFC-enabled object.

NFC enables contactless tickets and cards to be held in everyday devices like mobile phones. Instead of carrying several physical cards, users may choose to carry some or all cards within a personal device like an NFC-enabled mobile phone. Presenting such an NFC device simplifies common transactions.

Near Field Communication is based on inductive-coupling, where loosely coupled inductive circuits share power and data over a distance of a few centimeters. NFC devices share the basic technology with proximity (13.56 MHz) RFID tags and contactless smartcards.

Due to their low RF operating frequencies, NFC devices, as well as other inductive-coupling based devices, require a long antenna to achieve proper resonance. Contactless smartcards typically have the same form factor as a credit card and have the antenna running near the periphery of the card. Several conductive loops are required to achieve the necessary antenna length.

The antenna of a fixed reader/writer is similarly shaped and includes some type of user icon or "target mark" indicating where the user should place his or her portable device (e.g., contactless smart card, key fob, NFC-enabled mobile phone, etc.) in order to transfer information. With some devices such as those having the same form factor as a credit card, it is fairly obvious to the user how to position the device relative to the reader/writer in order to establish communication.

Conversely, when the antenna is embedded within a mobile phone or other portable device, it may not be so intuitive how the device should be positioned relative to the reader/writer as the typical user does not know where the NFC antenna is located in the device. For example, studies have shown that users of mobile phones oftentimes assume that the cellular antenna will be used for the NFC or other inductive-coupling based communication. In reality, however, the cellular antenna and the NFC antenna are separated within the device in order to avoid having the two RF communications interfere with each other.

Simple techniques have been developed to help a user guide the phone or other portable device to the proper location to establish the short-range communication. One such technique is to have the portable device give some sort of indication to the user once communication has been established, e.g., a vibration or beep. In the case where the other device with which the portable device is attempting to communicate is a powered reader/writer, the reader/writer also may give an indication such as beeping, flashing an indicator light, etc. Such binary indications are generally satisfactory, but are not useful to a user if the user is having trouble finding the target mark due to unfamiliarity with the location of the antenna in the portable device.

Furthermore, none of these conventional techniques are very useful when the target device is a passive tag that does not transmit any RF signal. The cue may only be given after an initial data transfer from the tag has occurred. Moreover, even in the case of a powered reader/writer the cues described above provide only an indication of how close the devices are but do not indicate how the portable device should be repositioned in order to improve the quality of the short-range link. The user must guess which direction to move the portable device (and thus the antenna) to find a better position.

In view of the aforementioned shortcomings associated with existing portable devices using NFC or other short-range, inductive-coupling based technologies, there is a strong need in the art for a device and method that will assist the user in properly positioning the device in relation to a corresponding device.

SUMMARY

According to one aspect of the invention, a portable electronic device is provided that includes an antenna and at least one of a transmitter or a receiver connected to the antenna for transferring information between the portable electronic device and a corresponding device via inductive coupling through the antenna, the corresponding device including a visual indicator (target mark) indicative of the location of the corresponding device's antenna. The portable electronic device further includes an imaging device for obtaining an image of the visual indicator, an image analyzer for determining a location of the portable electronic device antenna relative to that of the corresponding device based on the image, a direction analyzer for determining a movement direction of the portable electronic device that would reduce an alignment offset between the antennas, and a directional indicator for indicating the movement direction to a user of the portable electronic device.

In accordance with a particular aspect, the imaging device includes a camera lens and image capture element.

According to another aspect, the portable electronic device includes a camera that allows the user to take pictures, and the imaging device and camera share the camera lens and image capture element.

According to still another aspect, the imaging device includes a beam scanner.

In accordance with yet another aspect, the directional indicator includes a visual display.

According to another aspect, the visual display includes a two-dimensional display.

With yet another aspect, the visual display includes a plurality of discrete directional indicators.

With still another aspect, the image analyzer utilizes an image recognition program to identify the visual indicator within the image.

According to still another aspect, the direction analyzer utilizes vector analysis to determine the movement direction.

In accordance with another aspect, the portable electronic device is a mobile phone.

According to another aspect, operation parameters of the portable electronic device are determined as a function of recognition of the visual indicator within the image.

According to another aspect of the present invention, a method is provided for guiding a user of a portable electronic device to a communication position in relation to a corresponding device. The portable electronic device includes an antenna, at least one of a transmitter or a receiver connected to the antenna for transferring information between the portable electronic device and the corresponding device via inductive coupling through the antenna, and the corresponding device includes a visual indicator (target mark) indicative of the location of the corresponding device's antenna. The method includes the steps of obtaining an image of the visual indicator, determining a location of the portable device antenna relative to that of the corresponding device based on the image, determining a movement direction of the portable electronic device that would reduce an alignment offset between the antennas, and indicating the movement direction to a user of the electronic device.

According to a particular aspect, the step of obtaining the image utilizes a camera lens and image capture element included in the portable electronic device.

According to another aspect, the step of obtaining the image utilizes a beam scanner included in the portable electronic device.

In accordance with still another aspect, the step of indicating the movement direction utilizes a visual display included in the portable electronic device.

According to still another aspect, the visual display comprises a two-dimensional display.

With yet another aspect, the visual display includes a plurality of discrete directional indicators.

In still another aspect, the step of determining the location utilizes an image recognition algorithm to identify the visual indicator within the image.

According to another aspect, the step of determining the movement direction utilizes vector analysis.

In yet another aspect, the portable electronic device is a mobile phone.

According to still another aspect, operation parameters of the portable electronic device are determined as a function of a step of recognizing the visual indicator within the image.

In accordance with still another aspect of the invention, a portable electronic device is provided that includes an antenna, at least one of a transmitter or a receiver connected to the antenna for transferring information between the portable electronic device and a corresponding device via inductive coupling through the antenna, the corresponding device including a visual indicator (target mark) indicative of the location of the corresponding device's antenna, an imaging device for obtaining an image of the visual indicator, and a display for displaying the image to a user in a manner indicative of the relative location of the antennas.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

The present invention will now be described with reference to the drawings, in which like reference labels refer to like elements throughout.

Figure 1:
FIG. 1 is an environmental view representing use of a portable electronic device in accordance with an exemplary embodiment of the present invention.

Referring initially to FIG. 1, a portable electronic device 20 is shown in accordance with an exemplary embodiment of the present invention. The portable electronic device 20, as will be explained more fully below, has NFC or other inductive-coupling based, short-range connectivity capabilities. Thus, the portable electronic device 20 is able to communicate with another NFC or similar type device.

For example, FIG. 1 illustrates an environment where a user of the portable electronic device 20 wishes to obtain information regarding an upcoming concert. A display 22 includes graphics 24 and/or text 26 telling of the concert. In addition, the display 22 includes one of the aforementioned NFC "target marks" 28. The target mark 28 indicates to the user the ability to communicate data via NFC or similar inductive-coupling based technology. The display 22 may include a passive NFC device (not shown) containing detailed information regarding the concert. Alternatively, the display 22 may include an active device such as a reader/writer (not shown) that may provide detailed information regarding the concert as well as read information from the portable electronic device 20 (e.g., address information) so that additional information can be provided to the user via conventional mail, email, etc.

The target mark 28 is an icon or similar type graphic which indicates physically the particular location or "landing zone" that a device (such as the portable electronic device 20) needs to come into close proximity with or touch in order to obtain, transmit, or otherwise exchange or transfer information with the corresponding device in the display 22. As a practical matter, the target mark 28 will typically indicate the physical location of the NFC antenna for the device included in the display 22. As discussed above in relation to the underlying technology, the user of the portable electronic device 20 needs to place the device in close proximity to the target mark 28 in order to enable communication between the portable electronic device 20 and the corresponding NFC device in the display 22.

The present invention deals particularly with the ability of the portable electronic device 20 to assist the user in properly positioning the device in relation to the target mark 28 and its corresponding device. As will be described in greater detail below, the present invention is based on the portable electronic device 20 obtaining an electronic image of the target mark 28. Based on such image, the portable electronic device 20 is able to determine any offset in the alignment between the portable electronic device 20 and the target mark 28. Moreover, the portable electronic device 20 is able to provide a display to the user indicating the direction the user should move the portable electronic device 20 in order to reduce the offset. In such manner, the portable electronic device 20 effectively guides the user to the correct or optimum placement of the portable electronic device 20 relative to the target mark 28 and its corresponding device. The user does not need to know the specific location of the NFC antenna within the portable electronic device in order to properly locate the antenna relative to the target mark 28, thus overcoming the aforementioned disadvantages associated with conventional devices.

In the following description, the portable electronic device 20 is described primarily in the context of a mobile phone 20. It will be appreciated, however, that the device 20 may be any type of portable electronic device (e.g., a personal digital assistant (PDA), personal media player, etc.). The particular type of portable electronic device is not germane to the present invention in its broadest sense.

Furthermore, the mobile phone 20 and corresponding device are described herein primarily in the context of being NFC devices. However, it will be appreciated that the devices need not be NFC devices per se, but can be any type of devices that utilize short range communication techniques (e.g., RFID tags, contactless smartcards, etc.).

Figure 2:
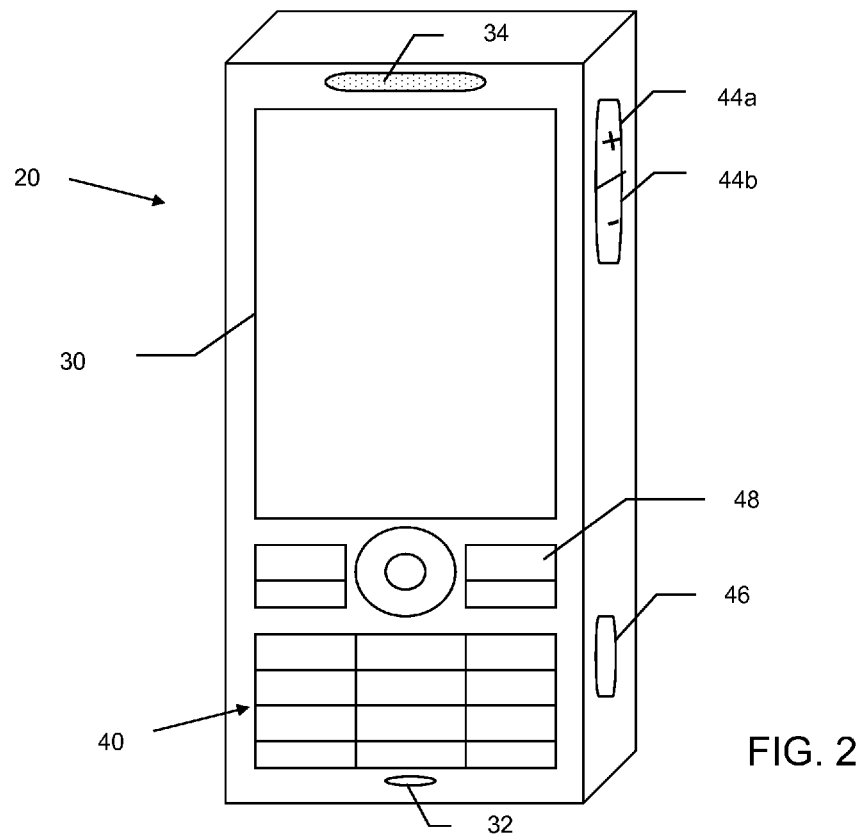
FIG. 2 is a front view of a portable electronic device in accordance with an exemplary embodiment of the present invention.
Figure 3:
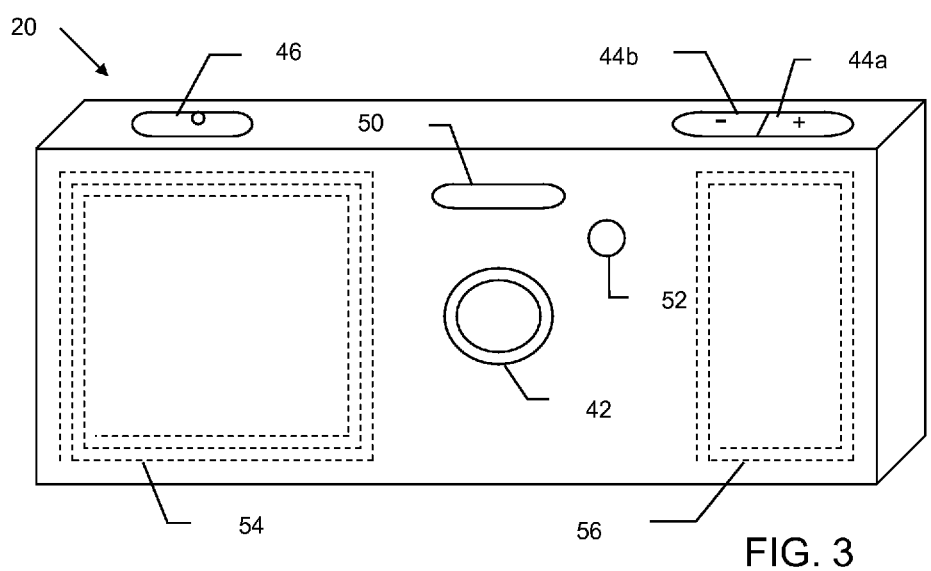
FIG. 3 is a rear view of the portable device of FIG. 2 in accordance with an exemplary embodiment of the present invention.

Referring now to FIGS. 2 and 3, the exemplary embodiment of the mobile phone 20 includes a liquid crystal display 30 serving as a graphical user interface (GUI). The display 30 provides a display of various types of information as is conventional. For example, the display 30 may display the operational status of the phone 20, contact information, menu information, text, graphics, images, videos, etc. When the mobile phone 20 is utilized as a camera as described herein, the display 30 may function as an electronic viewfinder to aid the user when taking a photograph. In addition, in the case where the display 30 is a touch sensitive display, the display 30 may serve as an input device to allow the user to input data, menu selections, etc.

According to an exemplary embodiment of the present invention, the display 30 also serves to provide a directional indicator when a user is establishing an NFC communication with a corresponding device (e.g., as represented by the target mark 28 of FIG. 1). As described in more detail below in relation to FIGS. 4-6, the display 30 provides a directional indicator for indicating a movement direction to the user in order to align the mobile phone 20 with the corresponding device (e.g., via the target mark 28) for NFC communication.

The mobile phone 20 includes a microphone 32 and a speaker 34. As is conventional, the microphone 32 and speaker 34 allow a user to carry out conventional voice communications by placing the phone 20 adjacent the user's ear. In addition, the mobile phone 20 includes a keypad 40 having an assortment of keys. The keypad 40 facilitates user input and operation of the mobile phone 20 as is conventional. For example, the keypad 40 may include keys for navigating the menus displayed on the display 30, selecting predefined functions such as camera operation, initiating or terminating a call, etc.

In the exemplary embodiment, the mobile phone 20 includes a camera as represented by camera lens 42 shown in FIG. 3. The camera allows the user to take still images and/or videos with the mobile phone 20 in addition to engaging in conventional voice communications. In addition, however, the mobile phone 20 may utilize the camera in order to obtain images of target marks such as the target mark 28 (FIG. 1) when setting up an NFC communication in accordance with the present invention. Alternatively, the camera may be dedicated specifically for obtaining images of target marks in accordance with the present invention. In yet another embodiment, other means for obtaining an image of a target mark may be utilized in place of or in addition to the camera. For example, the mobile phone 20 may include a beam scanning imaging device, such as the type used to read 3D bar code images.

Preferably the camera lens 42 or other imaging device included in the mobile phone 20 includes a wide angle lens having a relatively wide field of view. As will be appreciated based on the following description, the wider the field of view of the imaging device the better able the mobile phone 20 is to guide the user to proper alignment using the target mark 28. In addition, the lens 42 preferably includes a macro lens that enables good imaging even at very close focal lengths.

Continuing to refer to FIGS. 2 and 3, the mobile phone 20 also may include other keys or buttons useful in the operation of the mobile phone 20. For example, the mobile phone 20 includes buttons 44a and 44b mounted on a side face of the mobile phone housing. During use of the mobile phone 20 as a telephone or media player, for example, the buttons 44a and 44b serve as a convenient means to allow a user to adjust the volume up or down, respectively. In addition, the mobile phone 20 includes a button 46 that allows a user to answer or "pick up" an incoming call simply by pressing the button 46.

Furthermore, when the mobile phone 20 operates as a camera, the buttons 44a and 44b respectively function to increase and decrease the amount of zoom provided by the camera. The button 46, on the other hand, functions as a shutter button. As is conventional, by depressing the button 46 only part way, autofocus control circuitry within the mobile phone 20 is able to lock in the camera auto focus. By depressing the button 46 completely, the camera shutter function is activated and a photograph taken.

The mobile phone 20 additionally includes a key 48, or the like, that the user activates when initiating an NFC communication in accordance with the present invention. For example, when the user presses the key 48 the mobile phone 20 begins a routine for guiding the user to position the mobile phone 20 relative to the target mark as described in more detail below with respect to FIG. 7. As the user continues to press the key 48, the mobile phone 20 continues to provide an indication on the display 30 as to what direction the user should move the mobile phone 20, if at all, in order to better position the mobile phone 20 for NFC communication. In this manner, the user may home in on the optimum position. While the exemplary embodiment of the present invention uses a dedicated key 48 to initiate such operation, those having ordinary skill in the art will appreciate that other means (e.g., menu operations, etc.) could be used to do the same without departing from the scope of the invention. Note that the same means may also be used to enable the NFC transceiver.

FIG. 3 illustrates a typical orientation of the mobile phone 20 when utilized as a camera. As is shown, the rear of the housing contains the camera lens 42 and a flash element 50 for providing light under low lighting conditions. In addition, the mobile phone 20 may include an autofocus transducer 52 for providing autofocus operation of the lens 42.

As is shown in phantom in FIG. 3, the mobile phone 20 includes within its housing an NFC antenna 54 and a cellular phone antenna 56. FIG. 3 illustrates how the antennas 54 and 56 preferably are located towards opposite ends of the mobile phone 20 in order to avoid interference therebetween. In the exemplary embodiment, the NFC antenna 54 is located directly below the camera lens 42 when the mobile phone 20 is held in the upright position as represented in FIGS. 1 and 2, for example. Conversely, the cellular antenna 56 is located above the camera lens 42.

Figure 4:
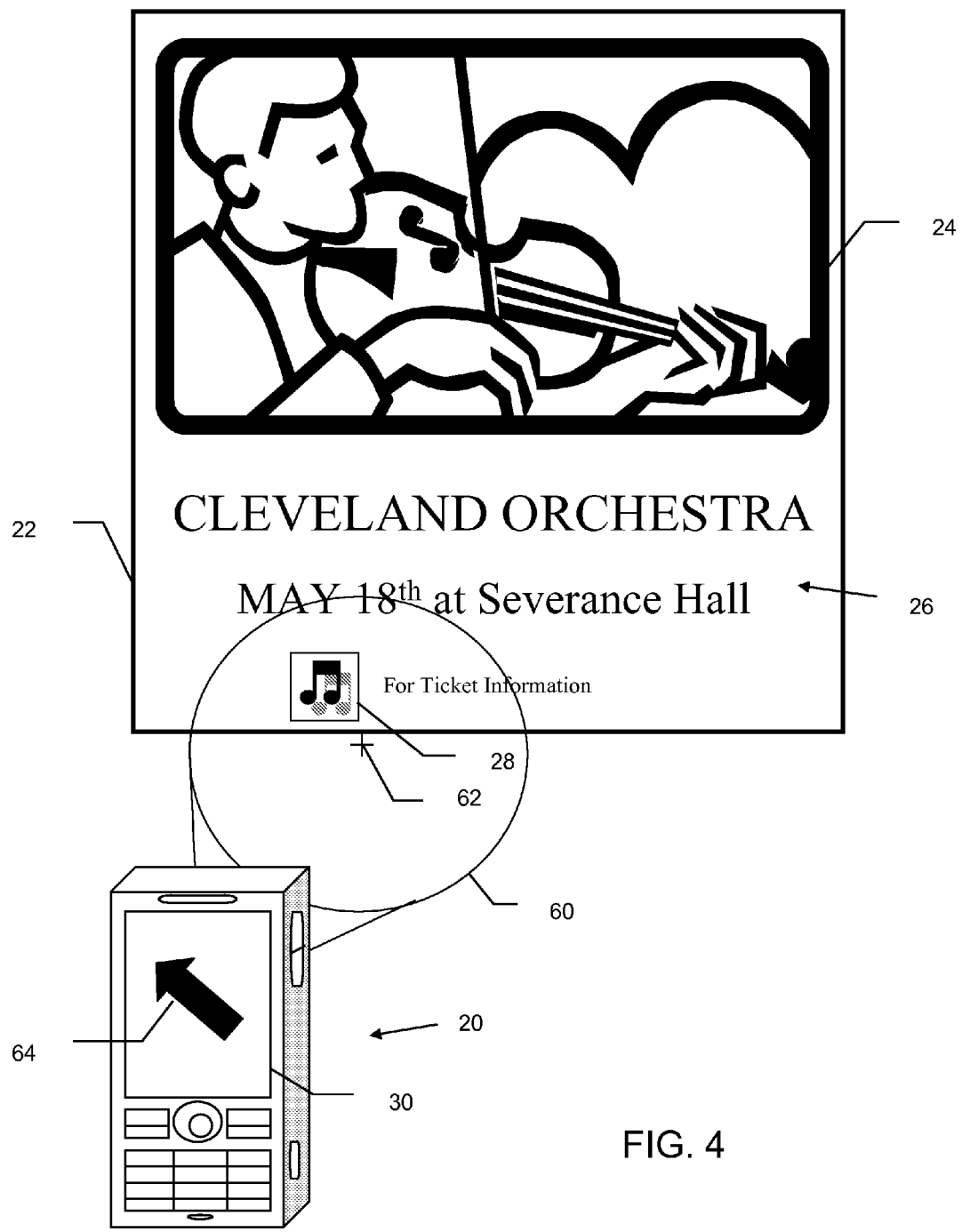
FIG. 4 is the environmental view of FIG. 1 shown with the guidance aspect of the present invention activated.

FIG. 4 illustrates the manner in which a user will position the mobile phone 20 towards the target mark 28 in order to engage in an NFC communication. In the exemplary embodiment, the user holds the mobile phone 20 upright as shown such that the camera lens 42 will be positioned directly above the NFC antenna 54. Initially, the user should hold the mobile phone 20 within a few centimeters of the target mark 28 with the camera lens 42 pointed towards the target mark 28. The user then presses the key 48 (FIG. 2) in order to initiate the guidance aspects of the present invention as well as, optionally, the NFC transceiver itself. As a result, the camera lens 42 in combination with the camera within the mobile phone 20 takes an image of the display 22 including the target mark 28 as represented by the field-of-view 60 of the camera.

The mobile phone 20 applies known image recognition techniques to the image acquired by the camera, and thereby determines the position of the target mark 28 within the field-of-view 60. The center 62 of the field-of-view 60 preferably denotes the position of the camera lens 42 in a two-dimensional plane relative to the field-of-view 60 as will be appreciated. Thus, the position of the target mark 28 within the field-of-view 60 represents the position of the target mark 28 relative to the camera lens 42. Moreover, since the position of the NFC antenna 54 relative to the camera lens 42 is known based on the known spacing therebetween, the mobile phone 20 is able to determine the direction of any offset between the target mark 28 and the NFC antenna 54. Consequently, the mobile phone 20 is able to produce a directional indicator, such as an arrow 64, that indicates the direction the user should move the mobile phone 20 to reduce such offset.

Accordingly, FIG. 4 illustrates the situation where the user is holding the mobile phone 20 so that the NFC antenna 54 is below and to the right of the target mark 28. Thus, the display 30 produces arrow 64 that is directed upward and to the left. This prompts the user to move the mobile phone 20 upward and to the left in order to obtain a better alignment between the target mark 28 and the NFC antenna 54.

In another embodiment, the user may initiate the guidance control even while the mobile phone 20 is further away from the target mark 28 (e.g., within a meter or so). The user will have to move the mobile phone 20 closer to the display 22 in order to ultimately establish the NFC connection, but the guidance aspects of the invention may be engaged earlier as will be appreciated.

In another related embodiment, the image recognition aspect of the invention could always be left enabled. Whenever a target mark is detected, an indication would be given to the user and both the guidance control and NFC transceiver would be enabled. The automation inherent in this embodiment leads to a simpler user interaction. However, the embodiment is not considered preferred due to the power consumed by the imaging device as well as the possibility of enabling NFC unintentionally.

Preferably, the user maintains the mobile phone 20 a few centimeters away from the display 22 so as to avoid limiting the field-of-view 60 of the camera (or other imaging device). Further, the mobile phone 20 may include circuitry for sensing inadequate lighting and turning on the flash element 50 in order to provide additional lighting in low light conditions as will be appreciated.

Figure 5:
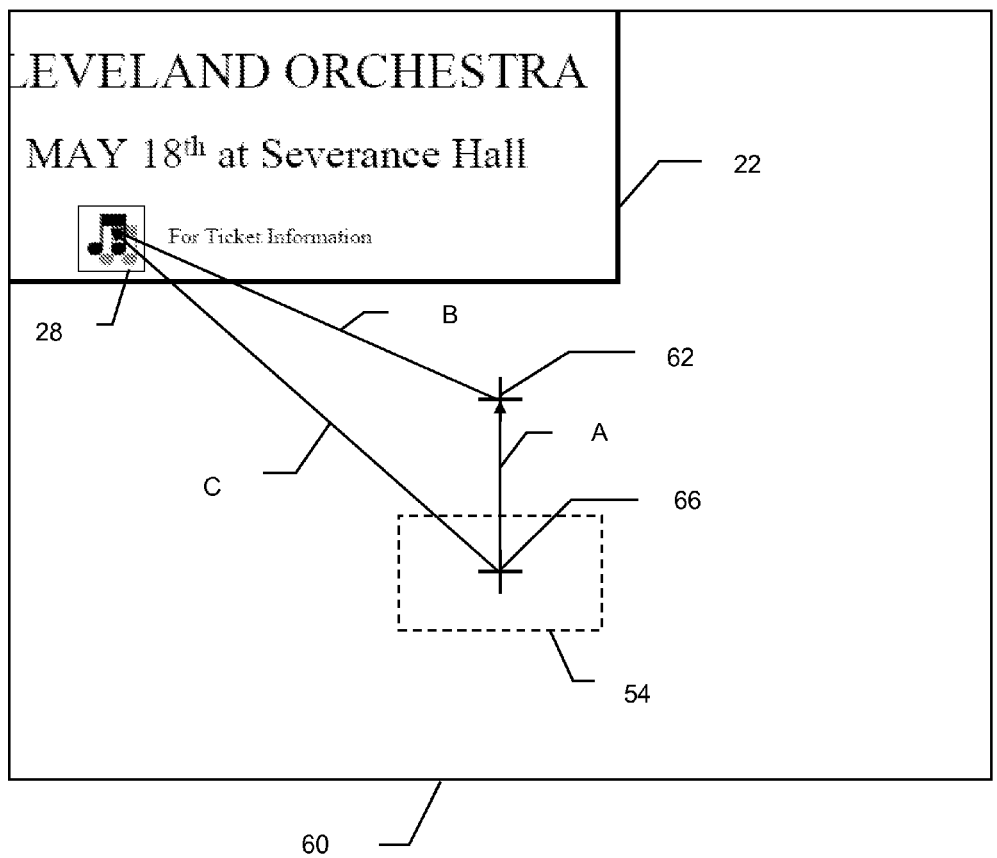
FIG. 5 is a schematic representation of the present invention determining a location of the portable device in relation to the corresponding device and providing an indication to the user as to the direction to move the portable electronic device to reduce an alignment offset.
Figure 5:
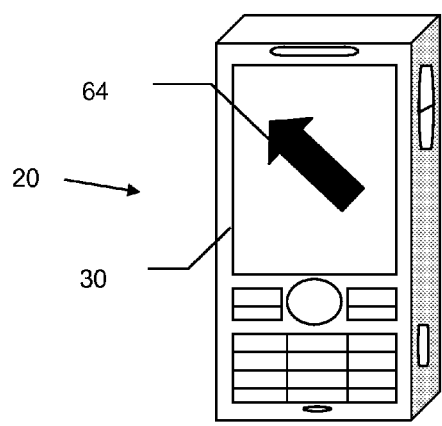

FIG. 5 illustrates how the mobile phone 20 may apply vector analysis to determine the desired movement direction to be displayed to the user in accordance with the present invention. As previously indicated, the field-of-view 60 represents the image acquired by the camera or other imaging device within the mobile phone 20. Mark 62 represents the relative position of the camera lens 42 within the 2D image obtained by the camera or other imaging device. The position of the camera lens 42 will typically be at the center as represented by mark 62, but need not be as will be appreciated. Nevertheless, the position of the camera lens 42 within the field-of-view 60 will be known by virtue of the physical properties of the camera or other imaging device as will be appreciated.

Additionally, the position of the NFC antenna 54 relative to the camera lens 42 or the field-of-view 60 itself will be known by virtue of the known physical properties and separation between the camera lens, the NFC antenna 54, etc. Thus, the label 66 may denote the center of the NFC antenna 54, and optimum position, within the field-of-view 60 as represented in FIG. 5. In an embodiment of the invention in which the position of the NFC antenna 54 is preestablished relative to the field-of-view 60 itself, it will not matter what orientation (e.g., vertical versus horizontal) the user holds the mobile phone 20 when obtaining the image, as will be appreciated.

Accordingly, vector A in FIG. 5 denotes the separation between the NFC antenna 54 and the camera lens 42 relative to the field-of-view 60. Vector B denotes the separation between the camera lens 42 and the target mark 28. Resultant vector C represents the separation or directional offset between the NFC antenna 54 and the target mark 28. Thus, by calculating or otherwise determining the direction of the resultant vector C the mobile phone 20 determines the movement direction of the mobile phone that would reduce an alignment offset between the NFC antenna 54 and the corresponding device as represented by the target mark 28.

Figure 6A:
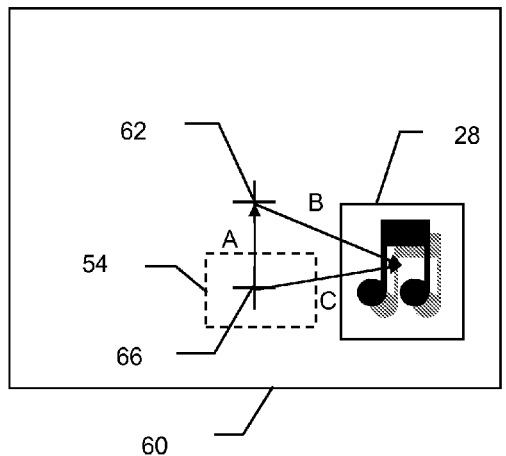
FIGS. 6A, 6B, 6C, 6D and 6E are additional examples of providing a user with an indication of the direction to move the portable electronic device in order to reduce an alignment offset with the corresponding device.
Figure 6B:
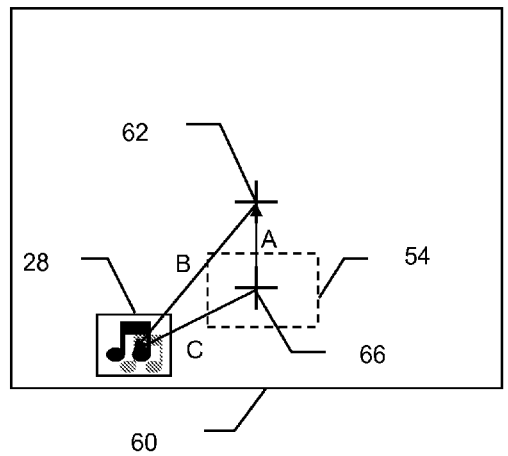
Figure 6C:
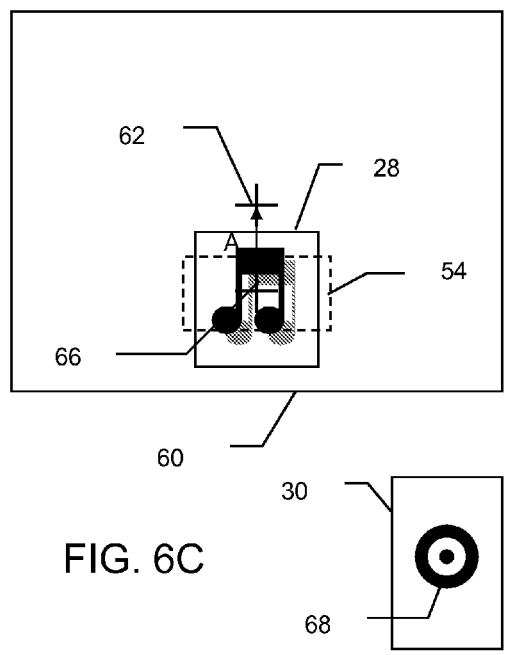

FIGS. 6A, 6B and 6C illustrate examples of the display 30 depending on the alignment of the NFC antenna 54 relative to the target mark 28. As previously noted, the mobile phone 20 captures the image within the field-of-view 60 and performs known image recognition techniques on the image to identify the position of the target mark 28. The target mark 28 may be a standardized icon or any other graphic of which the mobile phone 20 recognizes as a target mark. The mobile phone recognizes the target mark 28 within the image, and determines the directional offset between the NFC antenna 54 and the target mark 28 based thereon. In FIGS. 6A and 6B, the mobile phone 20 prompts the user via the display 30 to move the mobile phone 20 in a direction to reduce the offset. In FIG. 6C, the mobile phone 20 displays an "on-target" indicator such as a bullseye 68 to indicate proper alignment has been achieved.

While FIGS. 6A and 6B only indicated the 2D dimensional movement necessary for alignment, an indication of the distance from the target mark could also be presented. For example, a bar graph analogous to that used for indication of RF signal strength could be presented on the display in addition to the 2D arrow. Alternatively, the arrow could be made proportional in order to indicate the distance to the target mark. For this case, the base of the arrow may be made thicker to indicate forward movement is necessary. The autofocus transducer 52 could be used to assess the distance to the target mark as will be appreciated.

Figure 6D:
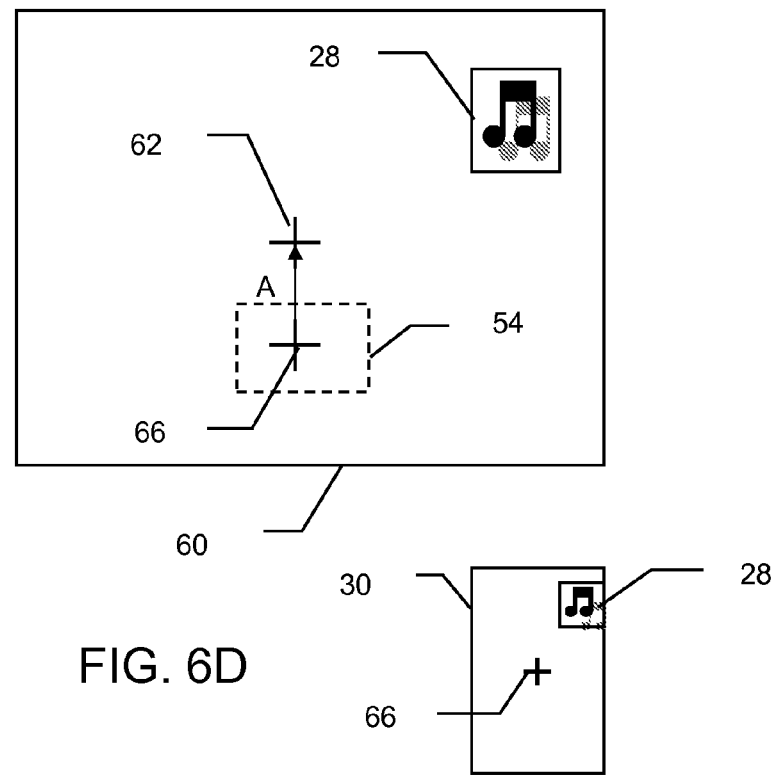
Figure 6E:
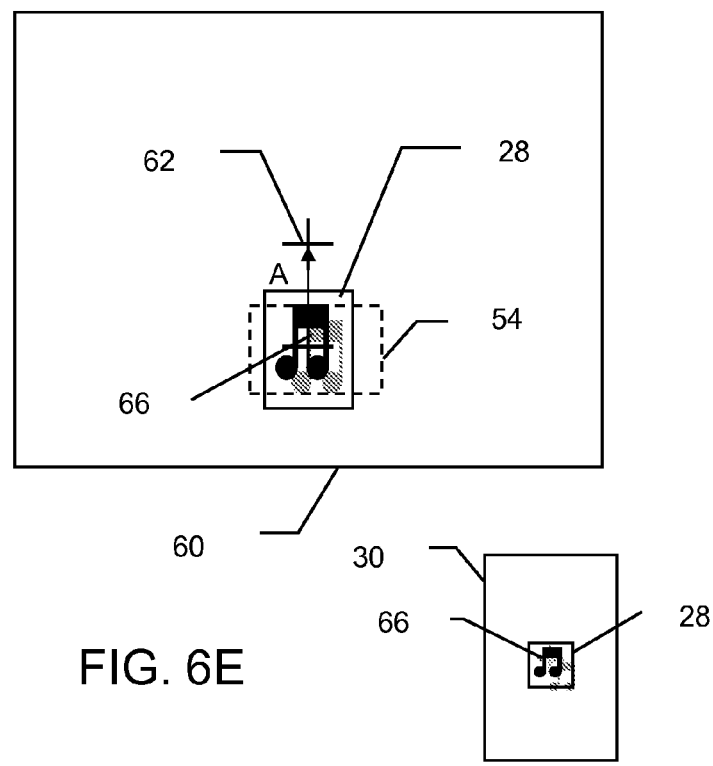

FIGS. 6D and 6E illustrate an alternative embodiment of the present invention for indicating a movement direction to a user. In this embodiment, the image acquired by the field-of-view 60 is presented to the user on the display 30 with an offset corresponding to vector A that causes the center of the display 30 to represent the relative position of the NFC antenna 54, represented by center 66. In this manner, the user essentially sees in "real-time" the relative positioning based on the image acquired by the camera within the mobile phone 20. During such operation, the center of the display 30 is coincident with the center 66 of the NFC antenna 54. Thus, the mobile phone 20 indicates the movement direction by virtue of the user knowing that the objective is to move the mobile phone 20 such that the target mark 28 appears in the center of the display 30. In this manner, the mobile phone 20 itself need not engage in image recognition.

Figure 7:
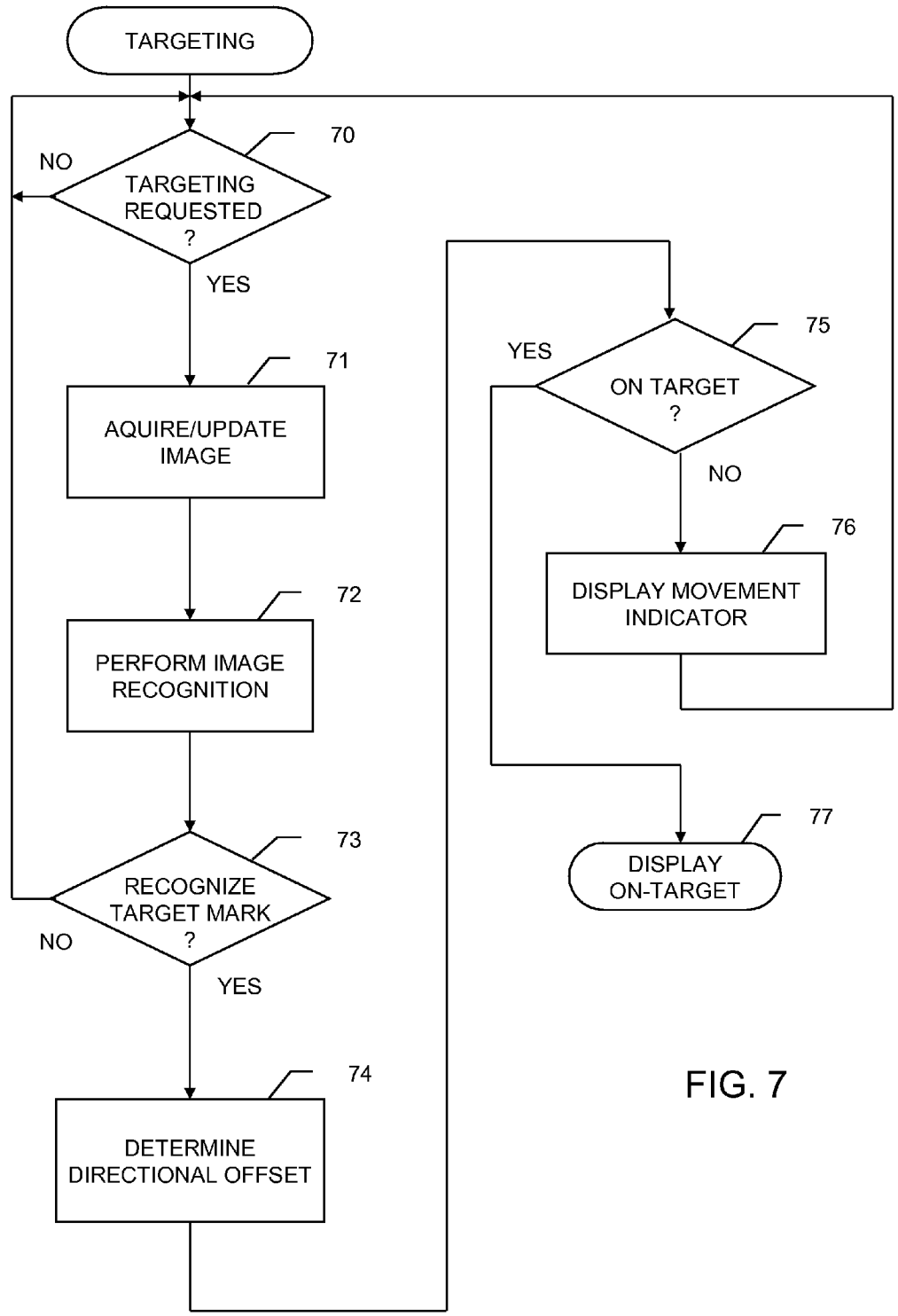
FIG. 7 is a flowchart describing the relevant operation of the portable electronic device in accordance with the exemplary embodiment of the present invention.

FIG. 7 is a flowchart suitable for programming the mobile phone 20 for carrying out the operation described herein in accordance with the present invention. In step 70 the mobile phone 20 determines if the user requests "targeting" or initiation of the NFC communication by virtue of the key 48 being pressed. If no, the mobile phone 20 continues to loop through step 70. If yes, the mobile phone 20 proceeds to step 71 in which it acquires/updates an image using the camera or other imaging device within the mobile phone 20.

Following step 71, in step 72 the mobile phone 20 utilizes known image recognition techniques to identify whether the target mark 28 is within the field-of-view 60 of the image obtained in step 71. If the target mark 28 is not recognized as represented in step 73, the mobile phone 20 returns to step 70. If the target mark 28 is recognized as represented in step 73, the mobile phone 20 proceeds to step 74 in which it determines the directional offset. Such directional offset may be determined using the vector analysis principles described above, although certainly other techniques may be used without departing from the scope of the invention.

Following step 74, the mobile phone 20 in step 75 determines if the NFC antenna 54 is in alignment with the target mark 28. The mobile phone 20 may judge this by virtue of the resultant vector C described above having a magnitude no greater than a predefined limit, for example. If the mobile phone 20 determines that the NFC antenna 54 is offset beyond the predefined limit, the mobile phone 20 proceeds to step 76.

In step 76, the mobile phone 20 displays an arrow 64 or other indicia on the display 30 as described above indicating the direction which the user should move the mobile phone 20 in order to reduce the offset. Following step 76, the mobile phone 20 returns to step 70 and the above process is repeated.

On the other hand, if the mobile phone 20 determines in step 75 that the NFC antenna 54 is in alignment with the target mark 28, the mobile phone 20 proceeds to step 77. In step 77, the mobile phone 20 displays an "on-target" display such as the bullseye 68 described above in relation to FIG. 6C.

It will be appreciated that the mobile phone 20, in addition to providing the guidance as described herein, may also provide conventional guidance techniques simultaneously. For example, audible or tactile clues can be given to enable the user to establish connectivity between the devices.

Figure 8:
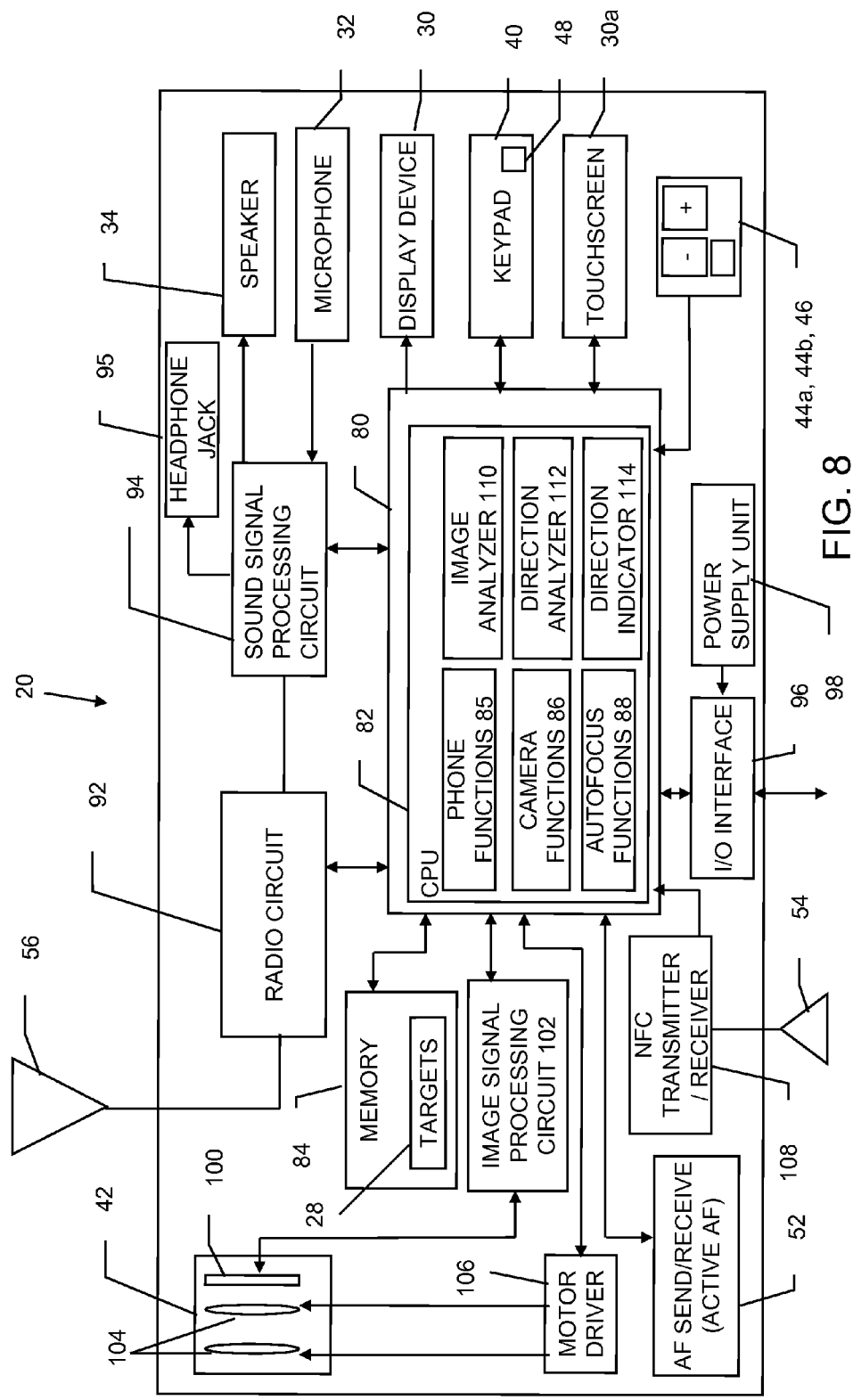
FIG. 8 is a block diagram of a portable electronic device in accordance with the exemplary embodiment of the present invention.

FIG. 8 represents a functional block diagram of the mobile phone 20 in accordance with the present invention. The construction of the mobile phone 20 is generally conventional with the exception of the NFC guidance capabilities described herein. Preferably, such capabilities are implemented primarily via software within the mobile phone 20. However, it will be apparent to those having ordinary skill in the art that such operation can be carried out via primarily software, hardware, firmware, or combinations thereof, without departing from the scope of the invention.

The mobile phone 20 includes a primary control circuit 80 that is configured to carry out overall control of the functions and operations of the mobile phone 20. The control circuit 80 may include a CPU, microcontroller, or microprocessor, etc., collectively referred to herein simply as a CPU 82. The CPU 82 executes code stored in memory (not shown) within the control circuit 80, and/or in a separate memory 84 in order to carry out conventional operation of the mobile phone functions 85 within the mobile phone 20. In addition, the CPU 82 executes code similarly stored in memory to carry out the camera functions 86 and autofocus functions 88 described herein.

Continuing to refer to FIG. 8, the mobile phone 20 includes an antenna 56 coupled to a radio circuit 92. The radio circuit 92 includes a radio frequency transmitter and receiver for transmitting and receiving signals via the cellular antenna 56 as is conventional. The mobile phone 20 further includes a sound processing circuit 94 that processes the audio signal transmitted by/received from the radio circuit 92. In addition, the sound processing circuit 94 serves to process an audio signal provided by the control circuit 80 during playback of media files, for example. Also coupled to the sound processing circuit 94 are the aforementioned microphone 32 and speaker 34, and a headset jack 95, for example. The radio circuit 92 and sound processing circuit 94 are each coupled to the control circuit 80 that carries out overall operational control.

The mobile phone 20 also includes the aforementioned display 30, keypad 40, buttons 44a, 44b and 46 coupled to the control circuit 80. The mobile phone 20 further includes an I/O interface 96. The I/O interface 96 may be in the form of any one of many typical mobile phone I/O interfaces, such as a multi-element connector at the base of the mobile phone 20. As is typical, the I/O interface 96 may be used to couple the mobile phone 20 to a battery charger to charge a power supply unit (e.g., battery) 98 within the mobile phone 20. Further, the I/O interface 96 may serve to connect the mobile phone 20 to a personal computer or other device via a data cable, etc., in order to download photographs or perform various other operations. As another alternative, the I/O interface 96 may serve to connect the mobile phone 20 to a docking station including an audio amplifier, speakers and/or video display to allow for enhanced viewing/listening of the media objects as part of a media player function.

As previously described, the mobile phone 20 includes the camera lens 42. The camera lens 42 serves to image an object (including any target mark 28) to an image capture device such as a charge-coupled device (CCD) array 100 included in the mobile phone 20. Images received by the CCD 100 are input to an image processing circuit 102 included in the mobile phone 20. Using conventional techniques, the image processing circuit 102 provides appropriate processing of the images under the control of the camera functions 86 so that images taken during camera operation (including during targeting based on target marks 28) are processed and stored in memory 84, for example.

The camera lens 42 preferably includes two or more lens elements 104. The relative positioning of the lens elements 104 with respect to each other and/or the CCD 100 may be adjusted mechanically via small motors or other electromechanical moving means (e.g., voice coil, piezoelectric element, etc.) included in the camera lens 42. In the exemplary embodiment, a motor driver 106 included in the mobile phone 20 controls the positions of the lens elements 104. The motor driver 106 is responsive to control signals from the control circuit 80 and adjusts the positions of the lens elements 104 in accordance with the control signals. Such control signals are derived from the output of the autofocus transducer 52 in combination with the autofocus functions 88 as are conventional.

Still referring to FIG. 8, the mobile phone 20 includes an NFC transmitter and/or receiver 108 coupled to the NFC antenna 54. The NFC transmitter/receiver 108 operates in a conventional manner insofar as data communication and exchange.

The mobile phone 20 further includes the image analyzer function 110, direction analyzer function 112 and direction indicator function 114 described herein. Upon the camera functions 86 obtaining an image as a result of a targeting request (e.g., by virtue of the user pressing the button 48) (see steps 70 and 71 of FIG. 7), the image analyzer function 110 analyzes the image to determine a location of the NFC antenna 54 relative to the corresponding device (i.e., via the target mark 28 within the image) (see steps 72 and 73 of FIG. 7). Specifically, the image analyzer function 110 performs conventional image recognition to determine which, if any, target marks 28 stored in memory 84 appear in the image. It is noted that the target marks 28 may be pre-stored in the memory 84 by the manufacturer, downloaded into the memory 84 by the user, etc.

If the image analyzer function 110 recognizes a target mark 28 within the acquired image, the direction analyzer function 112 then proceeds to determine the directional offset of the NFC antenna 54 relative to the target mark 28 as described herein (see steps 74). The direction indicator function 114 then determines the appropriate direction indicator to be displayed by the mobile phone 20 on the display 30 (see steps 75, 76 and 77).

Figure 9:
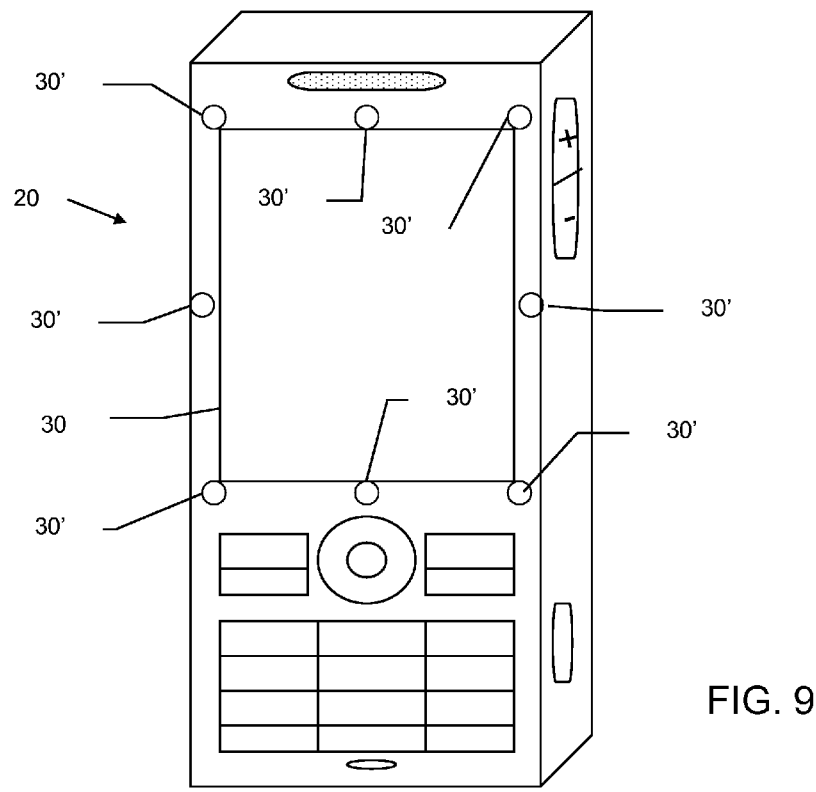
FIG. 9 is a front view of an alternative embodiment of a portable electronic device in accordance with the present invention.

It will be appreciated that the direction indicator provided by the mobile phone 20 need not be a graphic arrow, or the like, presented on a 2D display such as the display 30. For example, FIG. 9 illustrates an embodiment of the mobile phone 20 in which discrete display elements 30' such as small light emitting diodes (LEDs) surround the display 30. The elements 30' are positioned spatially so as to indicate to the user a direction in which the mobile phone 20 should be moved to reduce any offset in alignment. For example, if the NFC antenna 54 is offset a single element 30' indicating the direction of movement may be illuminated. Once the NFC antenna 54 becomes aligned, the mobile phone 20 may cause all of the elements 30' to illuminate simultaneously to indicate "on-target".

An advantage of the image recognition aspect of the present invention is that the mobile phone's recognition of a particular target mark 28 can be utilized to control how or what functions/operating parameters are presented to the user. For example, particular target marks 28 are associated with particular vendors, service providers, etc. Upon recognizing a particular target mark 28, for example as a result of the guidance operations described above, the mobile phone 20 may control how the mobile phone operates in conjunction with the user.

Figure 10:
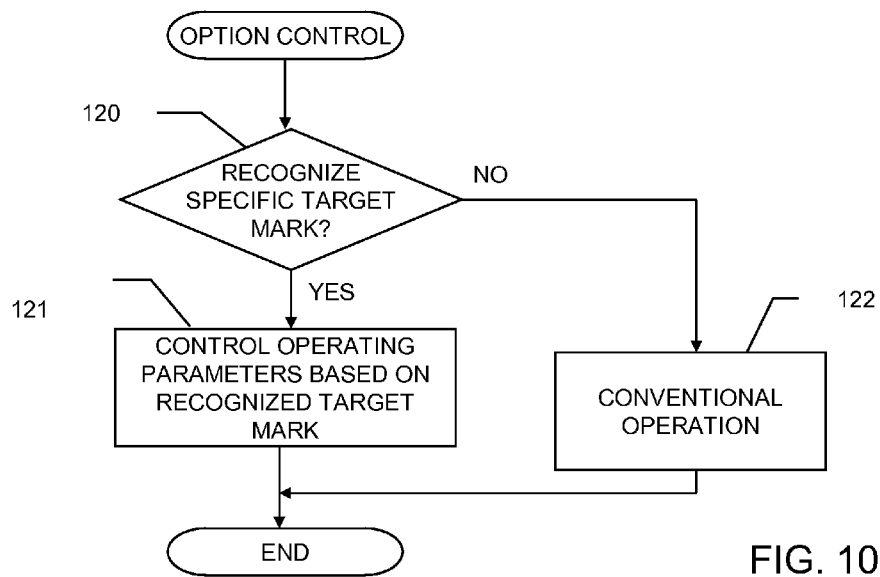
FIG. 10 is a flowchart describing another aspect of the present invention relating to controlling the operating parameters of the portable electronic device.

FIG. 10 illustrates how in step 120, the mobile phone 20 determines if a particular target mark associated with prescribed operations has been recognized. If yes, the mobile phone in step 121 controls the operations presented to the user in accordance with the particular target mark. For example, menu options associated with the service provider corresponding to the target mark 28 are given priority over other menu options. If no such particular target mark 28 is recognized in step 120, the mobile phone 20 provides conventional operation as represented in step 122.

Accordingly, the present invention provides a portable electronic device and method that assist a user in properly positioning the device in relation to the target mark and the corresponding device in NFC communications or the like. The user does not need to know the specific location of the NFC antenna within the portable electronic device in order to properly locate the antenna relative to the target mark, thus overcoming the aforementioned disadvantages associated with conventional devices.

While the present invention has particular utility in relation to devices communicating via short range inductive coupling, it will be appreciated that the invention also has utility with other short range wireless communication techniques. For example, the devices may communicate via other short range RF techniques such as Bluetooth, or even infrared or optical techniques. In each of these cases, the present invention may serve to reduce alignment offset. When using infrared or optical communication techniques, it will be appreciated that the emitter and/or detector of a given device may constitute its antenna.

The term "electronic device" as referred to herein includes portable radio communication equipment. The term "portable radio communication equipment", also referred to herein as a "mobile radio terminal", includes all equipment such as mobile phones, pagers, communicators, e.g., electronic organizers, personal digital assistants (PDAs), smartphones or the like.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A portable electronic device, comprising:
    an antenna;
    at least one of a transmitter or a receiver connected to the antenna for transferring information between the portable electronic device and a corresponding device via the antenna, the corresponding device including a visual indicator indicative of a location of an antenna of the corresponding device;

an imaging device having a field of view for obtaining an image of the visual indicator;

an image analyzer for determining an alignment offset of a location of the portable electronic device antenna relative to that of the corresponding device by indicating a position of the imaging device denoted in the field of view relative to a position of the visual indicator within the field of view;

a direction analyzer for determining a movement direction of the portable electronic device that would reduce the alignment offset between the antennas; and a directional indicator for indicating within the field of view the movement direction to a user of the portable electronic device.

2. The portable electronic device of claim 1, wherein the imaging device comprises a camera lens and image capture element.

3. The portable electronic device of claim 2, wherein the portable electronic device includes a camera that allows the user to take pictures, and the imaging device and camera share the camera lens and image capture element.

4. The portable electronic device of claim 1, wherein the imaging device comprises a beam scanner.

5. The portable electronic device of claim 1, wherein the directional indicator comprises a visual display.

6. The portable electronic device of claim 5, wherein the visual display comprises a two-dimensional display.

7. The portable electronic device of claim 5, wherein the visual display comprises a plurality of discrete directional indicators.

8. The portable electronic device of claim 1, wherein the image analyzer utilizes an image recognition program to identify the visual indicator within the image.

9. The portable electronic device of claim 1, wherein the direction analyzer utilizes vector analysis to determine the movement direction.

10. The portable electronic device of claim 1, wherein the portable electronic device is a mobile phone.

11. The portable electronic device of claim 1, wherein operation parameters of the portable electronic device are determined as a function of recognition of the visual indicator within the image.

12. The portable electronic device of claim 1, wherein the antennas are configured to transfer the information via inductive coupling.

13. A method for guiding a user of a portable electronic device to a communication position in relation to a corresponding device, the portable electronic device including an imaging device, an antenna, at least one of a transmitter or a receiver connected to the antenna for transferring information between the portable electronic device and the corresponding device via the antenna, and the corresponding device including a visual indicator indicative of a location of an antenna of the corresponding device, the method comprising the steps of:

obtaining an image of the visual indicator within a field of view of the imaging device;

determining an alignment offset of a location of the portable electronic device antenna relative to that of the corresponding device by indicating a position of the imaging device denoted in the field of view relative to a position of the visual indicator within the field of view based on the image;

determining a movement direction of the portable electronic device that would reduce the alignment offset between the antennas; and indicating within the field of view the movement direction to a user of the portable electronic device.

14. The method of claim 13, wherein the step of obtaining the image utilizes a camera lens and image capture element included in the portable electronic device.

15. The method of claim 13, wherein the step of obtaining the image utilizes a beam scanner included in the portable electronic device.

16. The method of claim 13, wherein the step of indicating the movement direction utilizes a visual display included in the portable electronic device.

17. The method of claim 16, wherein the visual display comprises a two-dimensional display.

18. The method of claim 16, wherein the visual display comprises a plurality of discrete directional indicators.

19. The method of claim 13, wherein the step of determining the location utilizes an image recognition algorithm to identify the visual indicator within the image.

20. The method of claim 13, wherein the step of determining the movement direction utilizes vector analysis.

21. The method of claim 13, wherein the portable electronic device is a mobile phone.

22. The method of claim 13, wherein operation parameters of the portable electronic device are determined as a function of a step of recognizing the visual indicator within the image.

23. The method of claim 13, wherein the antennas transfer the information via inductive coupling.

24. A portable electronic device, comprising:

an antenna;

at least one of a transmitter or a receiver connected to the antenna for transferring information between the portable electronic device and a corresponding device via the antenna, the corresponding device including a visual indicator indicative of a location of an antenna of the corresponding device;

an imaging device having a field of view for obtaining an image of the visual indicator;

a display for displaying a position of the imaging device and a position of the visual indicator within the field of view to a user in a manner indicative of an alignment offset in the field of view of the relative location of the antennas.

25. The portable electronic device of claim 24, wherein the antennas are configured to transfer the information via inductive coupling.

* * * * *